No. 660,041. Patented Oct. 16, 1900.
F. BALL.
SHOCKING ATTACHMENT FOR CORN HARVESTERS.
(Application filed Sept. 7, 1899.)
(No Model.)
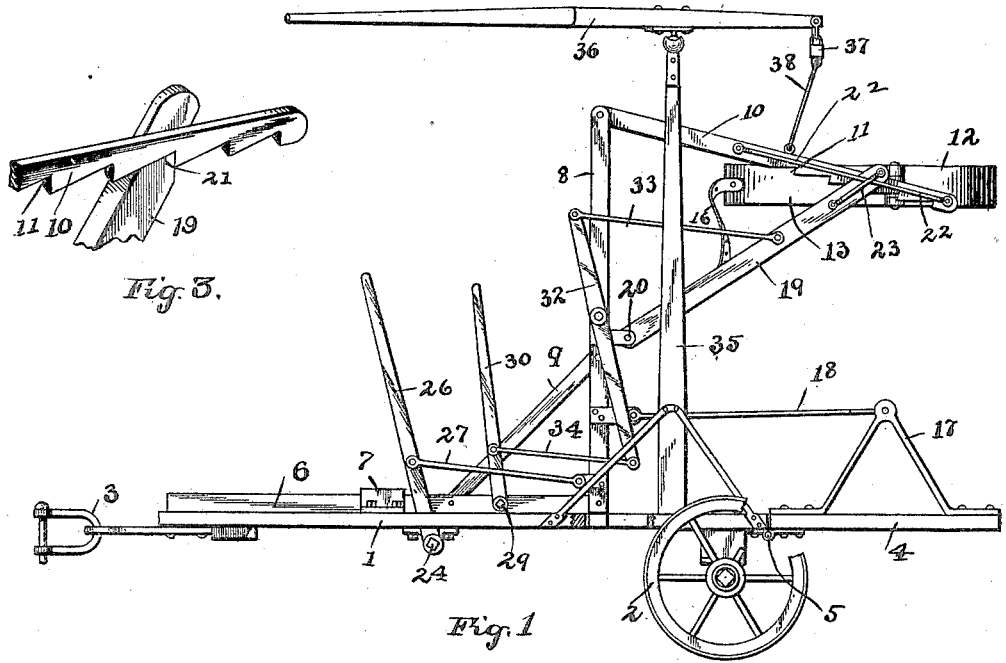
WITNESSES:
H. B. Bradshaw
A. L. Phelps.
INVENTOR
Frank Ball.
BY
C. C. Shepherd
ATTORNEY
THE NORRIS PETERS CO., PHOTO-LITHO., WASHINGTON, D. C.

UNITED STATES PATENT OFFICE.

FRANK BALL, OF BRICKNER, OHIO.

SHOCKING ATTACHMENT FOR CORN-HARVESTERS.

SPECIFICATION forming part of Letters Patent No. 660,041, dated October 16, 1900.

Application filed September 7, 1899. Serial No. 729,673. (No model.)

*To all whom it may concern:*

Be it known that I, FRANK BALL, a citizen of the United States, residing at Brickner, in the county of Putnam and State of Ohio, have invented a certain new and useful Improvement in Shocking Attachments for Corn-Harvesters, of which the following is a specification.

My invention relates to corn-shockers; and the objects of my invention are to provide a corn-shocking truck attachment for a corn cutting or harvesting machine of superior construction and arrangement of parts, to so construct said machine as to admit of its being readily connected with the platform or framework of any ordinary corn-cutting machine, to provide improved means for supporting and building the shock, to provide improved means for discharging the shock in an upright position, and to produce other improvements the details of construction and arrangement of parts of which will be more fully pointed out hereinafter. These objects I accomplish in the manner illustrated in the accompanying drawings, in which—

Figure 1 is a side elevation of my improved shocking-truck. Fig. 2 is a plan view; and Fig. 3 is a detail view in perspective, illustrating the adjustable connection of one of the shock-band-holding arms and a frame-brace arm.

Similar numerals refer to similar parts throughout the several views.

In carrying out my invention I employ a horizontal platform or truck-base 1, the rear portion of which is mounted upon oppositely-located truck or ground wheels 2. The forward end of the platform is provided with a suitable clevis attachment 3, through the medium of which the same may be readily connected with the frame or platform of a suitable corn-cutting machine.

4 represents a tail-board or dumping-platform which is hinged to the rear end of the platform 1, as indicated at 5, and which when in its raised or horizontal position forms a continuation or extension of said platform 1. Upon the upper side of the platform, near the lateral edges thereof, I provide longitudinally-arranged parallel sliding bars 6, the latter sliding in suitable guides or keepers 7, secured upon the platform. Rising from the rear end portion of each of these sliding bars 6 is a standard 8, these standards having a brace connection, as indicated at 9, with the bars. Fulcrumed to the upper end of each of the standards 8 is a rearwardly-projecting arm 10, these parallel arms being engaged on their under sides, as indicated at 11. Mounted between the outer portions of the parallel arms 10 is a shock supporting and forming band, which is formed of two sections, as indicated at 12 and 13, the section 12 being in the nature of a partially-circular and rigid strap and the section 13 being hinged thereto and adapted to open between the arms 10, in the manner indicated in Fig. 2. Each of these sections is preferably provided at intervals with forwardly-projecting radially-arranged spurs 14. In order to close the section or segment 13 and connect the outer end of the latter with the section 12, thereby forming a complete band, a suitable fastening device may be employed, that herein shown consisting of a buckle 15 and strap 16.

As indicated at 17, I provide the platform extension 4 with upwardly-projecting end brackets, which are connected with the standards 8 through the medium of supporting-rods 18, said rods being jointedly connected at their ends with said parts and serving when the bars 6 are in their most forward positions to retain said platform-section 4 in a horizontal plane beneath the shock-holding band or former.

19 represents adjusting brace-arms, the lower and inner ends of which are pivoted, as indicated at 20, to the standards 8 and the outer ends of which are provided on their inner sides with tooth-like shoulders 21, which are adapted to engage the under side notches 11 of the arms 10. These arms 10 are provided on their outer sides with longitudinal guide-rods 22, which pass through loops or keepers 23 on the outer sides of the brace-arms 19. Journaled beneath the platform 1 is a transverse rocking shaft 24, each end of which is provided with an upwardly-extending lever, the latter being indicated at 25 and 26, said levers extending through longitudinal slotted opening in said platform. The lever 26 is in the nature of a hand-lever and has jointedly connected therewith an operating-rod 27, which at its rear end is similarly connected with the lower portion of that standard 8 which is on the corresponding side of the machine. The lever 25, through the medium of a rod 28, is likewise connected with the opposite standard 8.

29 represents a transverse rocking shaft, which is journaled in the bars 6 and which is provided at each end with an upwardly-extending lever, the latter being indicated, respectively, at 30 and 31. Fulcrumed centrally on the outer side of each of the standards 8 is a lever-bar 32, the upper end of each of the latter being through the medium of a rod 33 jointedly connected with one of the brace-arms 19, while the lower end of each of the lever-arms 32 is similarly connected with each of the levers 30 and 31 through the medium of rods 34.

35 represents a vertical post, which, being suitably braced, rises from one side of the platform 1 near the rear end portion thereof, this post having fulcrumed on its upper end a lever 36, the outer end of which supports a transverse bar 37, the latter being, through the medium of links 38, jointedly connected with the upper sides of the arms 10.

In utilizing my invention the cornstalks from the cutting-machine are, as they fall from the cutter, received upon the forward portion of the platform 1, from which they are carried by a person stationed upon said platform and inserted in vertical positions within the stationary section of the shock holder or former 12. This operation is continued until a sufficient number of the stalks have been thus gathered within the holder and upon the extension 4 to constitute a desirable-sized shock. The hinge-section 13 is now pressed inward and closed in connection with the section 12, the spurs 14, by engaging the stalks, serving to assist in holding the shock closely therein. The stalks forming the shock may now be tied at a suitable height, after which the sliding bars are driven rearwardly on the platform by a rearward pressure on the hand-lever 26. This movement of the sliding bars 6 through the connection of the standards 8 thereof with the platform extension 4 serves to drop the latter downward, thus permitting the dropping of the shock onto the ground, which operation is facilitated by raising the outer end of the lever 36 until the teeth 21 of the brace-bars 19 are out of engagement with the notches of the arms 10 and throwing said brace-arms rearward by a forward movement of the lever 30. The shock thus being deposited on the ground and the former or holder opened, the outer end of the lever 36 may be raised to elevate said former to its normal position, during which operation the bars 19 will successively engage the notches of the arms 10 until the latter are in their normal horizontal positions. The platform extension may now be returned to its proper horizontal position by a forward movement of the lever 26.

From the above-described construction and operation it will be seen that means are provided not only for the proper formation and support of a corn-shock, but for delivering the same in a vertical position on the ground. It will be observed that the parts of my improved device are simple of construction, that the same may be produced at a reasonable cost of manufacture, and that said machine will be of great utility as an attachment for the ordinary classes of corn-cutting machines.

Having now fully described my invention, what I claim, and desire to secure by Letters Patent, is—

In a shocking attachment for corn-harvesters, the combination with a platform, a pair of ground-wheels thereunder and a platform-section 4 hinged to the main platform, of a sliding frame on said main platform, a corn-shock holder supported by said frame and consisting of a fixed and hinged section, rods 18 connecting said platform extension with said frame and means for sliding said frame on said platform, substantially as specified.

FRANK BALL.

In presence of—
A. T. Fox,
H. J. Schmitschulte.